Feb. 28, 1939.  E. G. JONES  2,149,054
FISH LURE
Filed March 21, 1938
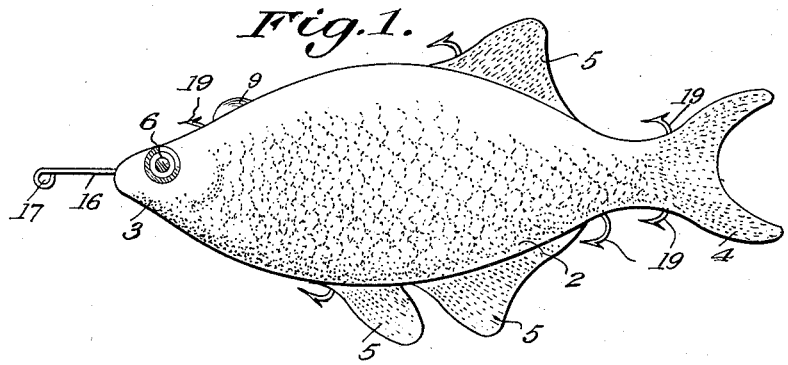
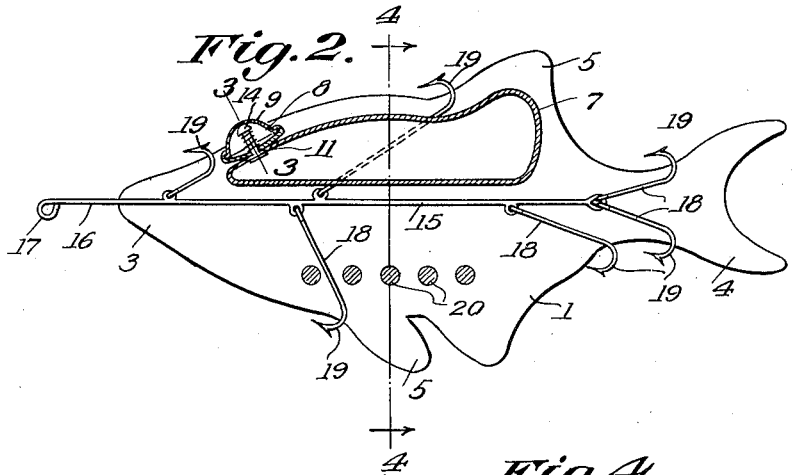
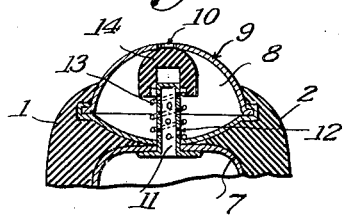
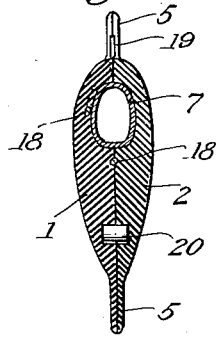
Edward G. Jones INVENTOR
BY Victor J. Evans & Co.
ATTORNEYS Patented Feb. 28, 1939

2,149,054

UNITED STATES PATENT OFFICE 2,149,054

FISH LURE

Edward G. Jones, Paisley, Fla.

Application March 21, 1938, Serial No. 197,250

3 Claims. (Cl. 43—46)

This invention relates to fish lures, and its general object is to provide an artificial lure or bait for fish and the like that has substantially all the characteristics of a live or natural minnow or fish generally used for bait, in that my lure not only simulates a natural minnow in shape, color and appearance, but possesses the natural yieldable qualities thereof, due to the fact that it is made essentially of soft rubber or the like, as distinguished from the conventional artificial minnow which is made from hard material such as wood or the like.

A further object is to provide an artificial fish lure that is weighted, but includes an air chamber therein with means for introducing air and releasing the same, to vary the contents of the chamber, so that the lure can be used at various depths within the water, as will be apparent.

Another object is to provide an artificial fish lure, in which the hooks thereof are materially protected or guarded against being caught in weeds, grass, obstructions or the like.

A still further object is to provide an artificial fish lure, that is simple in construction, inexpensive to manufacture and extremely efficient in use and service.

This invention also consists in certain other features of construction and in the combination and arrangement of the several parts, to be hereinafter fully described, illustrated in the accompanying drawing and specifically pointed out in the appended claims.

In describing the invention in detail, reference will be had to the accompanying drawing wherein like characters denote like or corresponding parts throughout the several views, and in which:

Figure 1 is a side elevation of the fish lure or bait, that forms the subject matter of the present invention.

Figure 2 is a sectional view taken longitudinally through the center thereof and illustrates parts in elevation.

Figure 3 is a sectional view taken approximately on line 3—3 of Figure 2.

Figure 4 is a sectional view taken approximately on line 4—4 of Figure 2.

Referring to the drawing in detail, it will be noted that my artificial fish lure and bait includes a body which is preferably made from a pair of like sections 1 and 2 having flat confronting faces, and each section is otherwise shaped so that when they are secured together by adhesive material or the like, the body is in the form of a minnow, as clearly shown in Figures 1 and 2.

Each section is made from soft rubber or other suitable flexible or resilient material, so that when they are secured together the body includes a head 3, a tail 4 and fins 5. However, the fins, as well as the tail are preferably very thin, so that they will be acted upon by the water when drawing the bait therethrough, to cause a waving movement thereof, to give a life like appearance, as will be apparent.

The body is painted or otherwise colored to simulate a minnow or the like, and an eye 6 is painted or otherwise applied on each side of the head.

Each section is provided with an elongated cavity in the flat confronting faces thereof, for registration with each other, to receive a hollow member 7 that provides an air chamber, and which is preferably arranged longitudinally of the upper portion of the body, as best shown in Figures 2 and 4.

The valve means for introducing and releasing air with respect to the air chamber includes a substantially oval shaped hollow member 8 mounted in the upper portions of the sections adjacent the forward end of the body and the member 8 is provided with a substantially dome-shaped upper wall portion 9 having an opening 10 therein, while the lower curved wall portion likewise has an opening that registers with an opening in the hollow member 7. Slidably mounted in the opening of the lower wall portion of the member 8, and the opening of the hollow member 7 is a flanged sleeve 11 that extends into the hollow member 8 and has a plurality of apertures 12 therein, and surrounding the sleeve 11 is a coil spring 13 for urging an elastic valve member against the upper wall portion 9, to close the opening 10 thereof.

It will be obvious that when it is desired to introduce air within the chamber of the member 7, the valve member is blown from its seat, to allow for the passage of air about the same, for passage through the member 8 into the member 7, the air being passed through the apertures 12, and when it is desired to relieve the air pressure within the air chamber of the member 7, the valve member is merely pushed from its seat by inserting a tool or the like through the opening 10.

The confronting faces of the sections 1 and 2 are grooved to receive the hook means of my lure, and the hook means includes a relatively long rod portion 15 that extends longitudinally of the body and through the head, the extending portion being indicated by the reference numeral 16 and terminates in an eye 17 to receive tackle means, as will be apparent. Formed on or otherwise secured to the rod 15 such as by eyes, as shown, are the shanks 18 of hooks 19, and the hooks which are of the usual barbed type extend through the body with their penetrating ends in close proximity thereto, there being six hooks in the form as shown that are arranged adjacent to the projecting parts of the lure that is the fins, tail and member 8, so as to be materially protected or guarded against being caught in weeds, grass or the like.

The lure is weighted and for that purpose, the sections are each provided with openings in the confronting faces thereof and within which are fixed lead weights 20, disposed in row formation, as shown in Figure 2.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:

1. An artificial lure in the form of a minnow, and comprising a pair of flexible like shaped sections having flat confronting faces secured together to provide a body including a head, a tail and fins, shanked hooks embedded in the body and extending therefrom, eyed means extending from the head and having the shanks of the hooks secured thereto, each section having a cavity in the confronting faces thereof, a hollow member mounted in the cavity and providing an air chamber, valve means for controlling the passage of air to and from the chamber, and weights embedded within said body.

2. An artificial lure in the form of a minnow, and comprising a weighted flexible body including a head, a tail and fins, shanked hooks embedded in the body and extending therethrough, means having the shanks of the hooks fixed thereto and extending longitudinally of the body and through the head with an eye on the outer end thereof, a hollow member mounted within the body and providing an air chamber, air receiving means communicating with the air chamber and having an opening therein to the atmosphere, and spring pressed valve means controlling the opening.

3. An artificial lure in the form of a minnow, and comprising a weighted flexible body including a head, a tail and fins, shanked hooks embedded in the body and extending therethrough for disposal adjacent the head, tail and fins, means having the shanks of the hooks fixed thereto and extending longitudinally of the body and through the head with an eye on the outer end thereof, a hollow member providing an air chamber and mounted within the body, valve means for controlling the passage of air to and from the air chamber and including a hollow member communicating with the chamber and having an opening therein to the atmosphere, a spring pressed sleeve mounted for slidable movement in the second hollow member and having openings therein communicating with the chamber, and an elastic valve member carried by the sleeve for controlling the opening.

EDWARD G. JONES.